(12) United States Patent
Andreasson et al.

(10) Patent No.: US 7,702,813 B2
(45) Date of Patent: Apr. 20, 2010

(54) USING PERSONAL DATA FOR ADVERTISEMENTS

(75) Inventors: Måns Folke Markus Andreasson, Lund (SE); Henrik Bengtsson, Lund (SE); David Sebastian Cronström, Malmö (SE); Bengt Gunnar Stavenow, Lund (SE); Henrik Baard, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 328 days.

(21) Appl. No.: 11/760,261

(22) Filed: Jun. 8, 2007

(65) Prior Publication Data

US 2008/0307112 A1 Dec. 11, 2008

(51) Int. Cl.
G06F 15/16 (2006.01)

(52) U.S. Cl. ...................................... 709/245
(58) Field of Classification Search .................. 709/245
See application file for complete search history.

(56) References Cited

U.S. PATENT DOCUMENTS

| 6,366,298 B1 | 4/2002 | Haitsuka et al. |
| 6,516,338 B1 * | 2/2003 | Landsman et al. ........... 709/203 |
| 6,697,824 B1 * | 2/2004 | Bowman-Amuah ......... 709/229 |
| 6,751,736 B1 * | 6/2004 | Bowman et al. ............. 713/189 |
| 7,337,127 B1 * | 2/2008 | Smith et al. .................... 705/14 |
| 2001/0054001 A1 | 12/2001 | Robinson |
| 2002/0124077 A1 * | 9/2002 | Hill et al. ..................... 709/224 |
| 2003/0093311 A1 | 5/2003 | Knowlson |
| 2005/0038698 A1 | 2/2005 | Lukose et al. |
| 2006/0085263 A1 | 4/2006 | Greer et al. |
| 2006/0199644 A1 * | 9/2006 | Hirota ........................... 463/42 |
| 2006/0282328 A1 | 12/2006 | Gerace et al. |
| 2007/0239569 A1 * | 10/2007 | Lucas et al. .................... 705/28 |
| 2008/0046916 A1 * | 2/2008 | Shivaji-Rao ................. 725/25 |

FOREIGN PATENT DOCUMENTS

WO  WO 02/086677 A2  10/2002

OTHER PUBLICATIONS

International Search Report and Written Opinion dated Mar. 31, 2008 issued in corresponding PCT application No. PCT/IB2007/054955, 12 pages.

* cited by examiner

Primary Examiner—Wing F Chan
Assistant Examiner—Tesfay Yohannes
(74) Attorney, Agent, or Firm—Harrity & Harrity, LLP

(57) ABSTRACT

A device may receive personal data that is collected at a client device, obtain a network address of a media device from the client device, send the network address to an advertisement device, and send the personal data to the advertisement device. The advertisement device may retrieve advertisements based on the personal data and send the retrieved advertisements to the media device.

20 Claims, 8 Drawing Sheets

USING PERSONAL DATA FOR ADVERTISEMENTS

TECHNICAL FIELD OF THE INVENTION

Implementations described herein relate to advertisements, and in particular, to using personal data to receive advertisements.

DESCRIPTION OF RELATED ART

By tailoring advertisements to a target audience, purchasing decisions of the target audience may be influenced. Information on demographics and consumer profiles may be collected to tailor the advertisements.

SUMMARY

According to one aspect, a method may comprise collecting personal data at a client device, obtaining a network address of a media device through a wireless communication link between the client device and the media device, sending the network address to a server that relays the network address to an advertisement device, and sending the collected personal data to the server. The server may relay the personal data to the advertisement device. The advertisement device may retrieve advertisements based on the personal data and send the retrieved advertisements to the media device.

Additionally, collecting personal data may include obtaining information about user preferences, tastes, or application usage patterns.

Additionally, the method may further comprise receiving user inputs that give a permission to send the personal data to the server.

Additionally, the method may further comprise detecting if the media device receives a new network address, and sending the new network address to the server if the media device receives the new network address.

Additionally, collecting personal data may include monitoring communication messages of applications at the client device, and extracting, from the messages, terms that indicate user preferences.

Additionally, collecting personal data may include obtaining a client identifier.

Additionally, obtaining a client identifier may include obtaining a user identifier that uniquely identifies a user.

Additionally, the method may further comprise receiving a request to send client identifiers as part of the personal data.

Additionally, receiving a request to send client identifiers may include receiving a request to send one or more of a language identifier, a home mobile land network identifier, a current mobile land network identifier, an identifier that identifies a model of the client device, or a user identifier.

Additionally, collecting personal data may include obtaining the client identifiers from within the request to send the client identifiers.

Additionally, sending the collected personal data may include forming a symbol string in accordance with a hypertext transfer protocol, concatenating to the string additional symbols that encode client identifiers in accordance with the hypertext transfer protocol, and sending the concatenated string.

Additionally, collecting personal data at a client device may include activating, via a browser, a link that incorporates a command to collect and send client identifiers.

According to another aspect, a device may comprise a processor. The processor may be configured to receive personal data that is collected at a client device, obtain a network address of a media device from the client device, send the network address to an advertisement device, and send the personal data to the advertisement device. The advertisement device may retrieve advertisements based on the personal data and send the retrieved advertisements to the media device.

Additionally, the personal data may include at least one of user preferences or client identifiers.

Additionally, the processor may be further configured to receive a new network address of the media device if the media device obtains the new network address.

Additionally, the processor may be further configured to send a request to send a client identifier as part of the personal data, or send a request to send the personal data.

Additionally, the request to send client identifiers may include a hypertext transfer protocol string that contains client identifiers.

According to yet another aspect, a device may comprise a processor. The processor may be configured to receive personal data that is collected at client devices from a server device, obtain a network address of a media device from the server device, receive the network address from the server device, determine if the media device is active, retrieve personal data based on the network address if the media device is determined as being active, retrieve advertisements based on the retrieved personal data and send the advertisements to the media device.

Additionally, the personal data may include words that are derived from filtering communication messages at the client devices.

According to a further aspect, a media device may comprise means to request personal data that is collected at a client device, means to receive the personal data from the client device, means to send the network address of the media device to an advertisement device, and means to send the personal data to the advertisement device, the advertisement device retrieving advertisements based on the personal data and sending the retrieved advertisements to the media device if the advertisement device is notified of activities at the media device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

The term "browser," as used herein, may refer to a software application that allows a user to interact with web resources at websites or hosts. The term "browsing information," as used herein, may refer to information about the use of browsers, such as a history of web resources that have been visited (e.g., websites or web documents), a list of favorite web resources, latest online purchases, a list of newsfeeds, words or terms that may have been inputted through browsers, etc.

The term "advertisement server," as used herein, may refer to a software application server that serves advertisements and/or other types of information, such as a search result. The advertisements may include text, video, audio, and/or images. In addition, a search result may include a list of universal resource locators (URLs), universal resource identifiers (URIs), abstracts of text, and/or other types of information or links. The search result may be obtained by inputting search terms to a search page hosted at the advertisement server via the browser. The search terms may include text, audio, images, and/or video.

The term "client identifier," as used herein, may include a symbol or a set of symbols that is associated with a device or a user and specifies a type, a class, and/or an object.

Overview

In implementations described herein, personal data may be sent by a client device to obtain information that is relevant to a user. A client device may send the personal data to a server device. Furthermore, if the client device interacts with a local media device, a network address of the local media device may be acquired by the client device and sent to the server device, which, in turn, may send the network address to an advertisement server device.

If the user uses the local media device, the local media device may connect and send its network address to the advertisement server device. The advertisement device may retrieve advertisements and/or information relevant to the user based on the personal data and may send the advertisements and/or the information to the local media device.

The personal data which the client device sends to the server device may not only include a profile of user's preferences and tastes (e.g., the types of music the user may listen to, browsing information, etc.), but may also include one or more client identifiers that are associated with the client device. The client identifiers may include information for identifying a language, a home mobile land network, a current mobile land network, a model of the client device, and the user.

Exemplary System Configuration

Figure 1:
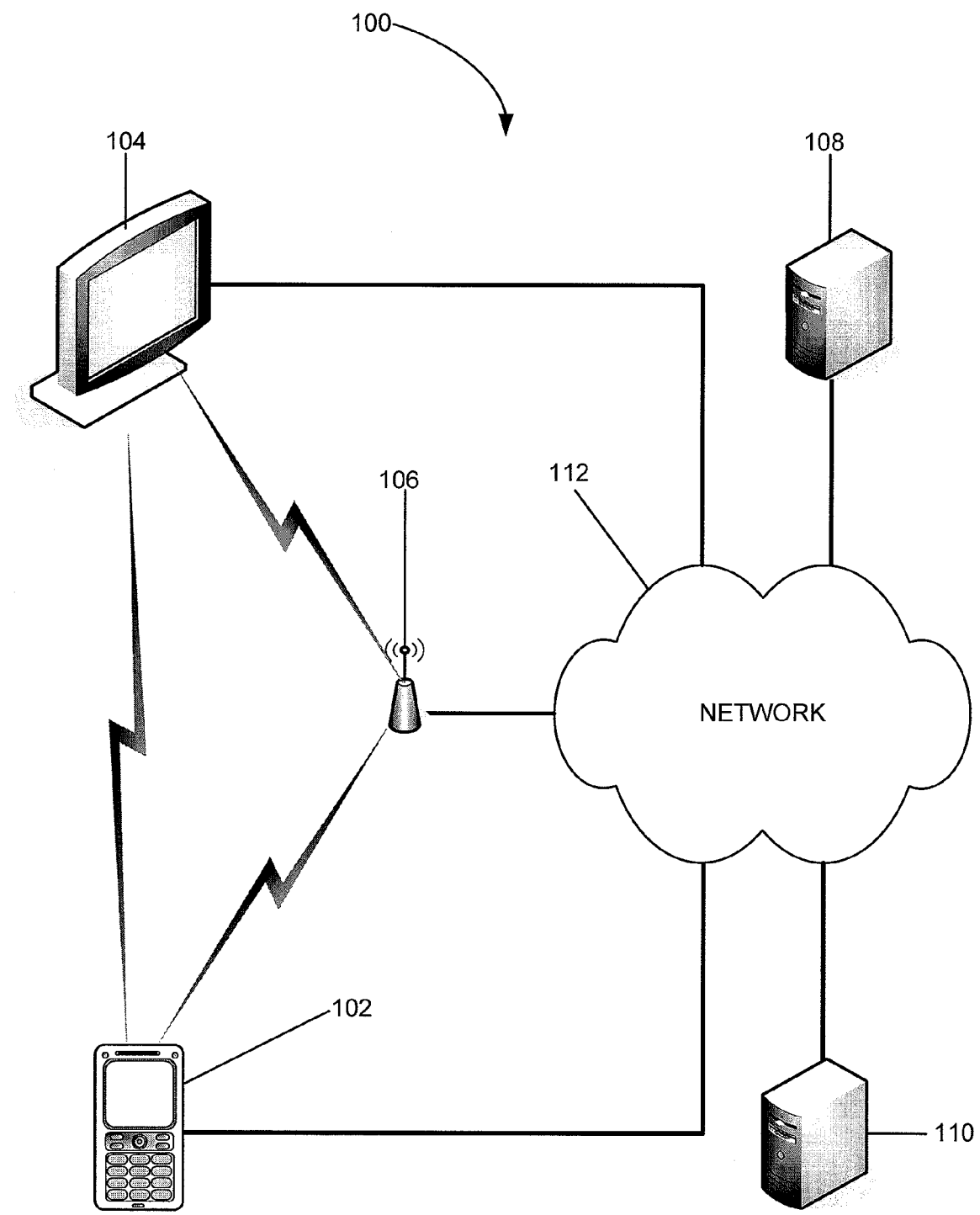
FIG. 1 shows a system in which concepts described herein may be implemented.

FIG. 1 shows an exemplary system that includes an implementation of concepts described herein. As shown, system 100 may include a client device 102, a local media device 104, wireless access point (WAP) 106, a server device 108, an advertisement server device 110, and a network 112. In other implementations, system 100 may include more, fewer, or different components. Moreover, one or more components of system 100 may perform one or more functions of another component of system 100. For example, client device 102 may perform functions that are associated with local media device 104, and server device 108 may perform functions that are associated with advertisement server device 110.

Client device 102 may include any of the following devices: a personal computer; a telephone, such as a radio telephone; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, global positioning system (GPS) receiver; or another type of computation or communication device.

Local media device 104 may include a device for accepting user inputs, receiving video/audio information from a network, and playing the video/audio information via one or more displays and/or speakers. Examples of local media device 104 include an Internet Protocol (IP) television, a personal computer that is outfitted with displays/speakers, client device 102, a peripheral such as a headset with or without a display, etc.

WAP 106 may include a device that provides a wireless access to a network. WAP 106 may provide wireless communication channels to and from devices and may relay information from the devices to a network through wired/wireless connections. In FIG. 1, WAP 106 may communicate with client device 102 and/or local media device 104 using any wireless communication protocol.

Server device 108 may include one or more computer systems for hosting server programs and/or applications. Server device 108 may receive a request for uploading or downloading applications/data from client applications that may be hosted by client device 102 and/or local media device 104, process the request, and transmit or receive data to and from client device 102 and/or local media device 104.

Advertisement sever device 110 may include one or more computer systems for searching, creating, and/or sending advertisements. The advertisements may include video, audio, text, image, or any other form of information.

Network 112 may include the Internet, an ad hoc network, a local area network (LAN), a wide area network (WAN), a metropolitan area network (MAN), a cellular network, a public switched telephone network (PSTN), any other network, or combinations of networks. Client device 102 and/or local media device 104 may connect to network 112 via WAP 106 or wired communication links.

Exemplary Devices

Figure 2:
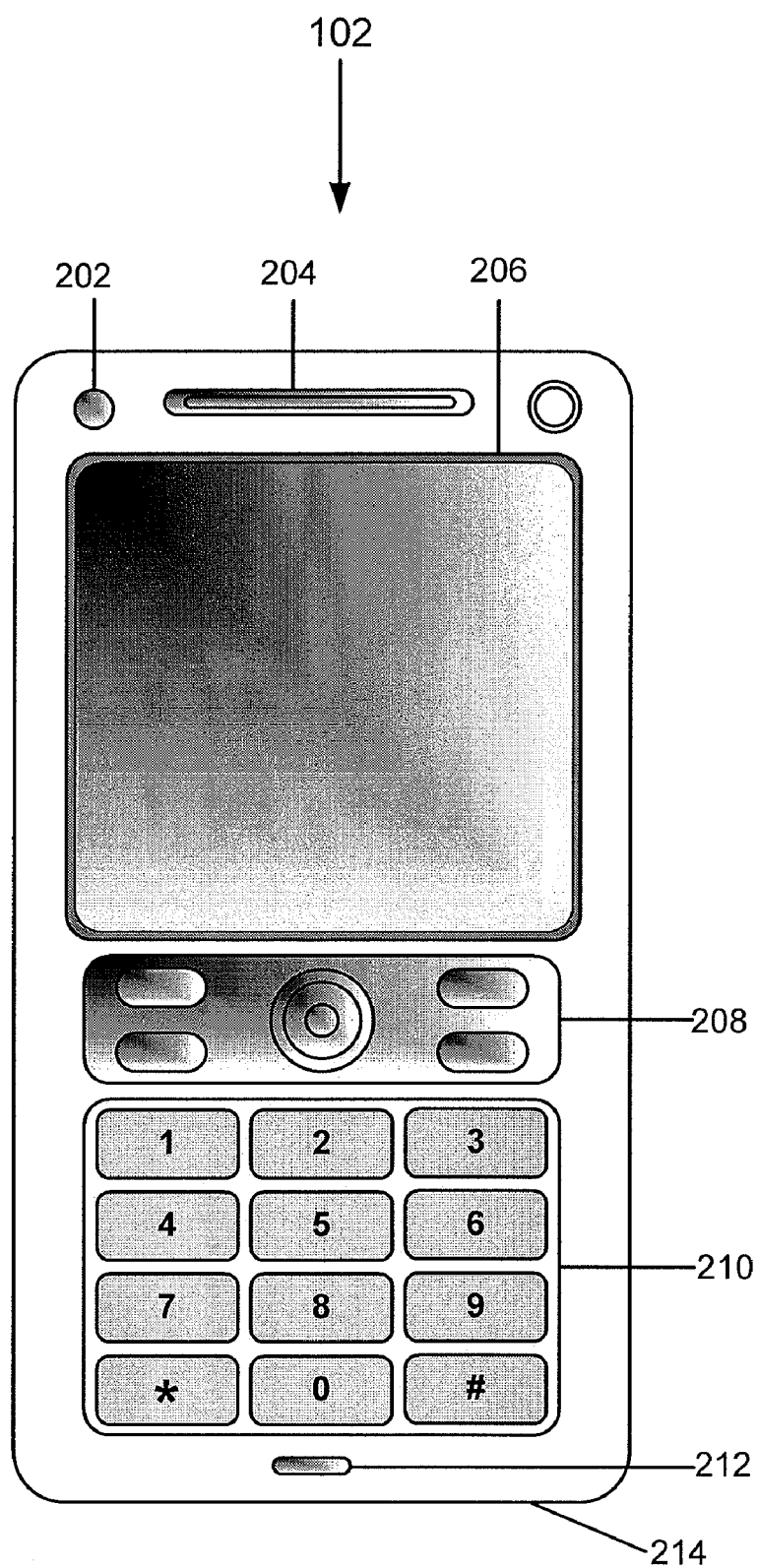
FIG. 2 is an exemplary diagram of one of the devices of FIG. 1.

FIG. 2 is an exemplary block diagram of client device 102. As illustrated, client device 102 may include a camera 202, a speaker 204, a display 206, control buttons 208, a keypad 210, a microphone 212, and a housing 214. Camera 202 may enable a user to view, capture and store media (e.g., images, video clips) of a subject in front of device 102. Speaker 204 may provide audible information to a user of client device 102. Display 206 may include a display screen to provide visual information to the user, such as video images or pictures, and may include a touch screen (e.g., a capacitive screen, near field screen) to accept inputs from a user. Control buttons 208 may permit the user to interact with client device 102 to cause client device 102 to perform one or more operations, such as place or receive a telephone call. Keypad 210 may include a standard telephone keypad. Microphone 212 may receive audible information from the user. Housing 214 may provide a casing for components of client device 102 and may protect the components from outside elements.

Figure 3:
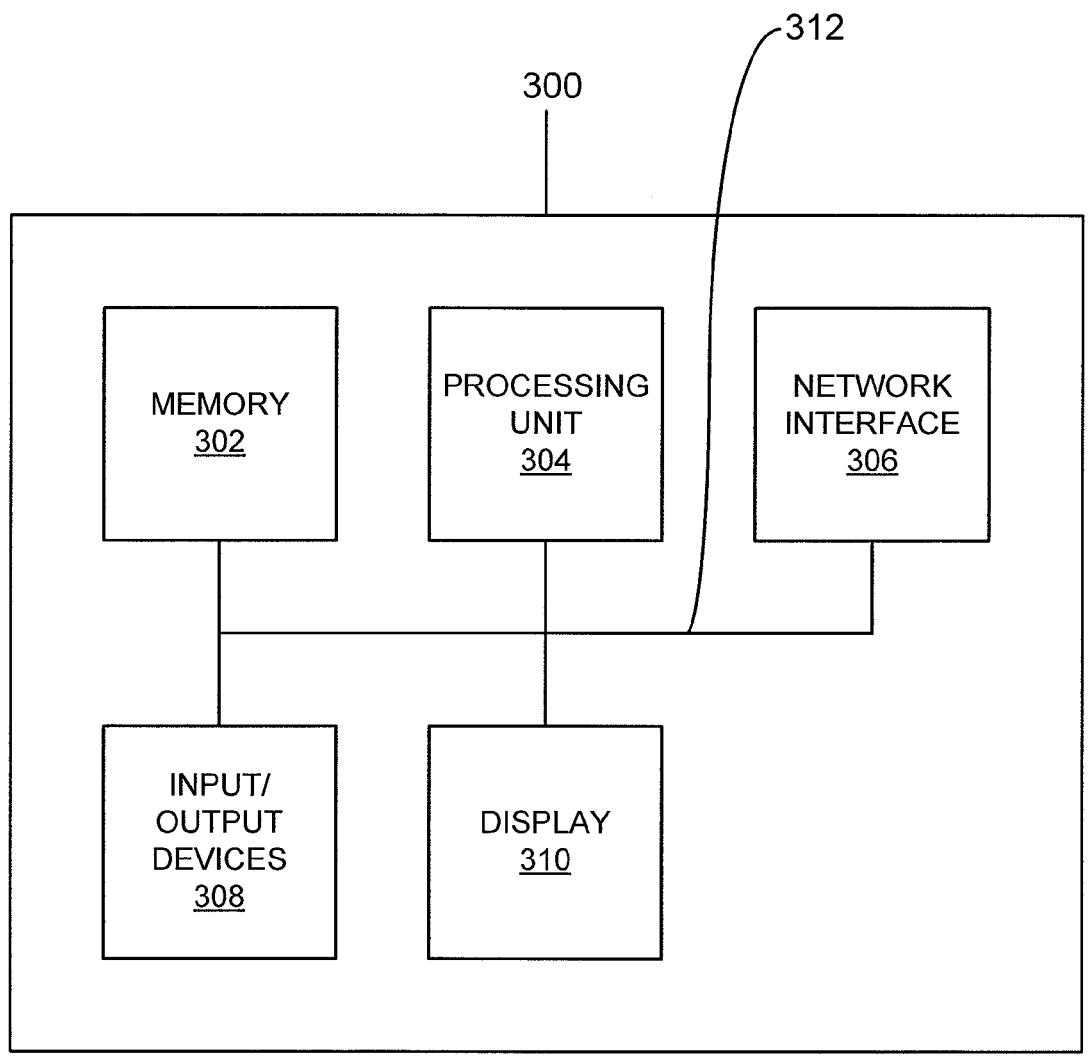
FIG. 3 is an exemplary block diagram of the device of FIG. 2.

FIG. 3 shows an exemplary block diagram of a device 300. Device 300 may represent client device 102, local media device 104, server device 108, and/or advertisement server device 110. As shown, device 300 may include memory 302, a processing unit 304, a network interface 306, input/output devices 308, a display 310, and a bus 312. Depending on implementation, device 300 may include additional, fewer, or different components. For example, if device 300 is implemented as client device 102 or local media device 104, device 300 may include a keypad. In another example, if device 300 is implemented as local media device 104, device 300 may include microprocessors that are optimized for processing video. In yet another example, if device 300 is implemented as server device 108 and/or advertisement server device 110, device 300 may include disks that can quickly process large quantities of data.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disk, and/or flash memory, as well as other types of storage devices. Processing unit 304 may include one or more processors, microprocessors, and/or processing logic capable of controlling device 300.

Network interface 306 may include any transceiver-like mechanism that enables device 300 to communicate with other devices and/or systems. For example, network interface 306 may include mechanisms for communicating via a network, such as the Internet, a terrestrial wireless network (e.g., wireless local area network (WLAN) interface, Bluetooth interface, Universal Serial Bus (USB) interface, near field communication (NFC) interface, etc.), a satellite-based network, etc. Additionally or alternatively, network interface 306 may include a modem, an Ethernet interface to a local area network (LAN), and/or an interface/connection for connecting device 300 to other devices (e.g., a Bluetooth interface). Further, network interface 306 may include receivers, such as a Global Positioning System (GPS) receiver.

Input/output devices 308 may include a keyboard, a keypad (e.g., keypad 210 of FIG. 2), a button (e.g., control buttons 208), a mouse, a speaker (e.g., speaker 204), a microphone (e.g., microphone 212), a Digital Video Disk (DVD) writer, a DVD reader, Universal Serial Bus (USB) lines, and/or other types of devices for converting physical events or phenomena to and/or from digital signals that pertain to device 300.

Display 310 may include a device that can display signals generated by device 300 as text or images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.) and a touch screen or a panel-enabled display that may function as a user input interface. For example, display 310 may include a pressure-sensitive (e.g., resistive), near field-sensitive (e.g., capacitive), acoustically-sensitive (e.g., surface acoustic wave), photo-sensitive (e.g., infra-red), and/or any other type of display overlay that allows display 310 to be used as an input device.

Bus 312 may provide an interface through which components of device 300 can communicate with one another.

Figure 4:
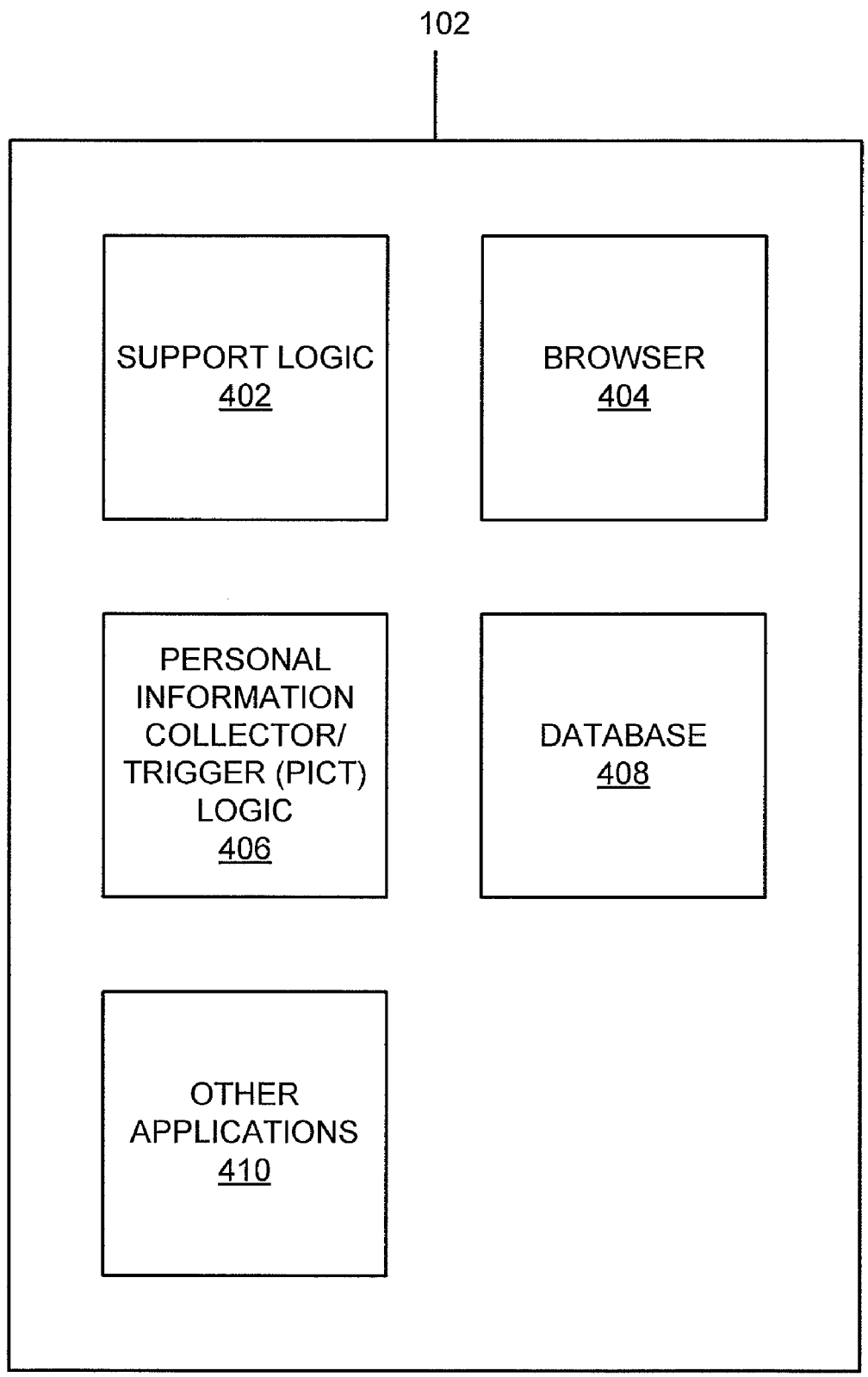
FIG. 4 is an exemplary functional block diagram of a client device of FIG. 1.

FIG. 4 is an exemplary functional block diagram of a device 400, which may represent client device 102 and/or local media device 104. As shown, device 400 may include support logic 402, a browser 404, personal information collector/trigger (PICT) logic 406, a database 408, and/or other applications 410. Depending on implementation, device 400 may include fewer, additional, or different types of components than those illustrated in FIG. 4. For example, if device 400 is implemented as local media device 104, device may exclude PICT logic 406.

Support logic 402 may include hardware and/or software for performing various support functions for other components in FIG. 4 (e.g., browser 404, PICT logic 406, etc.). For example, support logic 402 may provide interfaces between the components illustrated in FIG. 4 (e.g., other applications 410) and the components in FIG. 3 (e.g., network interface 306, input/output devices 308, and display 310). In yet another example, support logic 402 may provide a Transmission Control Protocol (TCP)/IP stack to support communication applications, such as browser 404.

Browser 404 may include a software application that allows a user to interact with web resources at websites or hosts. A user may use browser 404 to submit data to and receive information from server device 108 and/or advertisement server device 110.

PICT logic 406 may include hardware and/or software that may record personal data related to use of device 400, access the personal data, and send the personal data to other devices in system 100 (FIG. 1). In one implementation, PICT logic 406 may collect personal data from email messages, a calendar, personal contact information, words that have been inputted into various applications such as browser 404, instant messages, network addresses of devices that communicate with client device 102, etc. In some implementations, PICT logic 406 may be implemented as part of browser 404. In other implementations, PICT logic 406 may be implemented as a browser plug-in that attaches itself to browser 404 at browser startup and operates in conjunction with browser 404.

In sending the personal data to other devices in system 100, PICT logic 406 may accept a request from other components of client device 102 to send client identifiers, such as a language identifier (i.e., an identifier which specifies the native language of a user at client device 102), a home mobile land network identifier (e.g., an identifier of the home cellular network for client device 102), a current mobile land network identifier (e.g., an identifier of the cellular network in which client device 102 operates), a model identifier (e.g., an identifier of the model of client device 102), and a user identifier (e.g., a phone number). In many implementations, PICT logic 406 may aid browser 404 in interpreting and responding to links that contain embedded requests for the client identifiers.

Database 408 may act as an information repository for PICT logic 406 and/or other applications 410. For example, PICT logic 406 may retrieve and/or store a contact list, words that are obtained from filtering email messages/instant messages, calendar information, network addresses, client identifiers that may be associated with client device 102 and/or local media device 104, and/or other information from/to database 408. In another example, other applications 410 may store and/or retrieve email, text, and/or sounds stored in database 408.

Other applications 410 may include hardware and/or software for supporting various functionalities of device 400, such as text messaging, email, Multimedia Messaging, wireless communications (e.g., Bluetooth), image capturing and storing, infrared communications, web access, file uploading and downloading, image transfer, etc.

Figure 5:
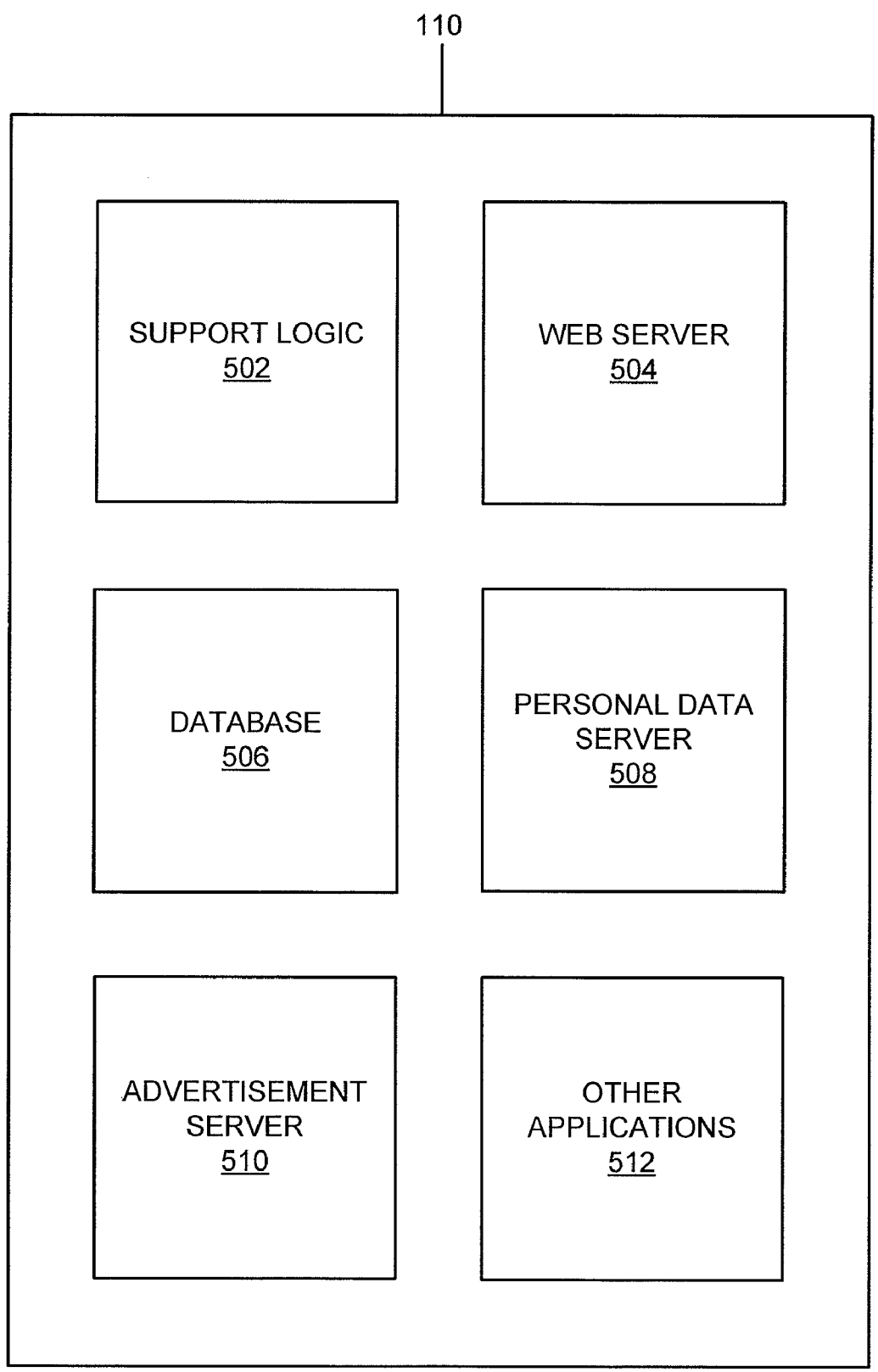
FIG. 5 is an exemplary functional block diagram of server devices of FIG. 1.

FIG. 5 is an exemplary functional block diagram of a device 500. Device 500 may represent server device 108 and/or advertisement server device 110. As shown, device 500 may include support logic 502, a web server 504, a database 506, a personal data server 508, an advertisement server 510, and other applications 512. In other implementations, device 500 may include fewer, additional, or different components than those shown in FIG. 5. For example, if device 500 is implemented as server device 108, device 500 may exclude advertisement server 510. In another example, if device 500 is implemented as advertisement server device 110, device 500 may exclude personal data server 508.

Support logic 502 may include hardware and/or software for performing various support functions for other components in FIG. 5 (e.g., web server 504, personal data server 508, advertisement server 510, etc). For example, support logic 502 may provide interfaces between the components illustrated in FIG. 5 (e.g., other applications 512) and the components in FIG. 3 (e.g., network interface 306). In yet another example, support logic 502 may provide a TCP/IP stack to support communication applications, such as web server 504.

Web server 504 may include hardware and/or software for accepting hypertext transfer protocol (HTTP) messages and other protocol (e.g., file transfer protocol (FTP), secure HTTP (HTTPS), etc.) messages and for providing responses to the messages (e.g., web documents, videos, images, sounds, etc.). For example, in response to a search request from browser 404 (FIG. 4) in client device 102, web server 504 may perform a search on behalf of the browser and may send the result of the search to client device 102.

Database 506 may act as an information repository for web server 504, a personal data server 508, an advertisement server 510, and/or other applications 512. For example, web server 504 may retrieve and store information in database 506 and may present the information as web pages to client devices. In another example, personal data server 508 may store and/or retrieve personal data related to users at one or more of client devices 102. In yet another example, advertisement server 510 may store and/or retrieve pieces of advertisements or full advertisements (e.g., video, audio, text, or image) from database 506.

Depending on the particular implementation, database 506 may include records, each of which has information associated with a client device (e.g., client device 102) and/or a user, as well as personal data that is related to a user, the client device, and/or local media devices (e.g., local media device 104) that have been accessed by the client device. If database 506 is located on server device 108, the records may be downloaded to advertisement server device 110 periodically or based on demand from advertisement server device 110.

Personal data server 508 may include hardware and/or software for downloading personal data from one or more of client device 102 and to upload the personal data to advertisement server device 110. If device 500 combines functionalities of server device 108 and advertisement server device 110, personal data server 508 may omit uploading the personal data.

Advertisement server 510 may include hardware and/or software for downloading the personal data from server device 108, obtain advertisements for each client device 102 based on the personal data and information from local media device 104, and to serve advertisements and/or other types of information to local media device 104. If device 500 combines functionalities of server device 108 and advertisement server device 110, advertisement server 510 may omit downloading the personal data from server device 108.

Other applications 512 may include hardware and/or software for supporting various functionalities of device 500, such as instant messaging server functions, email server functions, FTP server functions, etc.

Exemplary Process for Using Personal Data to Receive Advertisements

Figure 6:
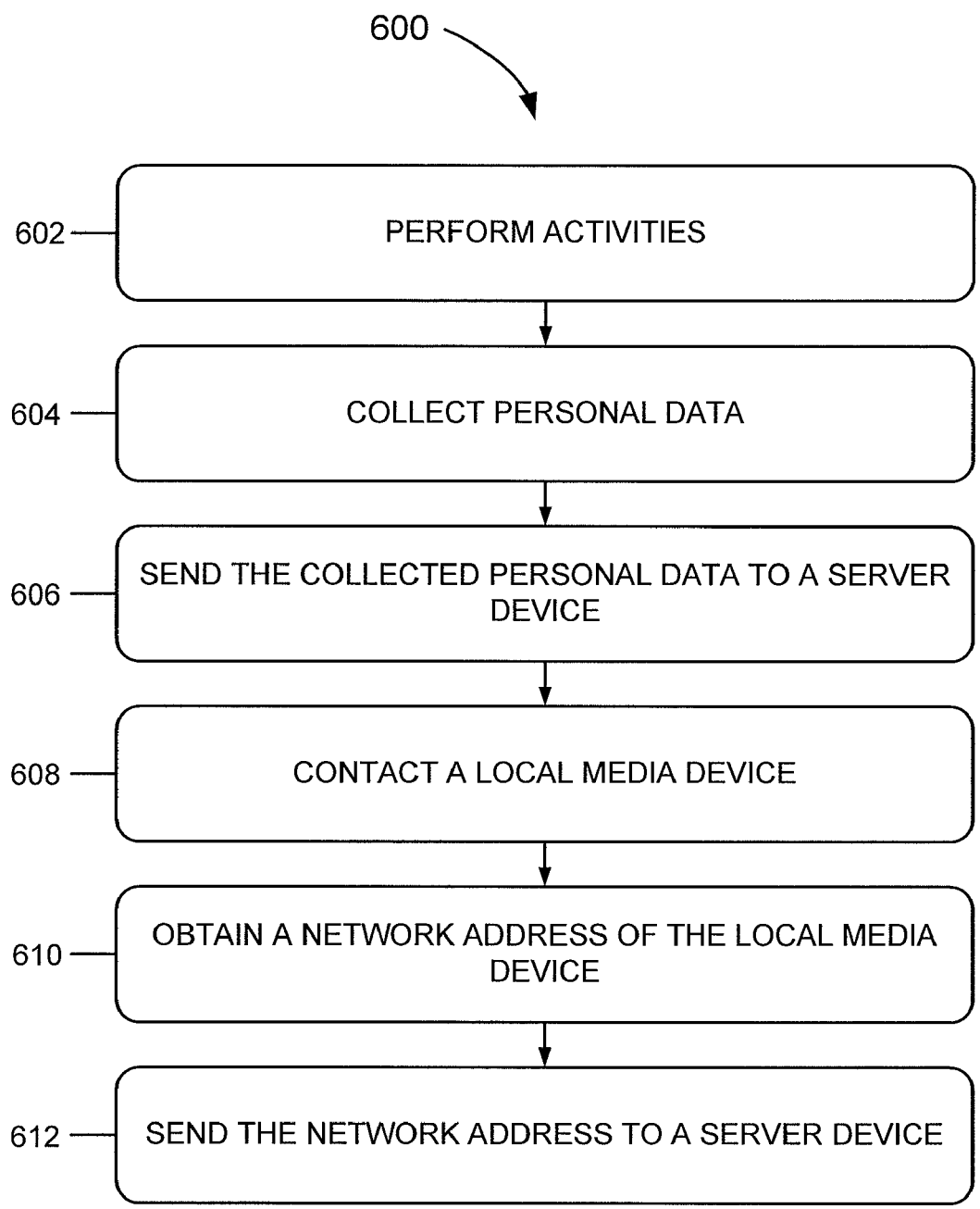
FIGS. 6 and 7 are flowcharts of exemplary processes for using personal data to obtain advertisements.
Figure 7:
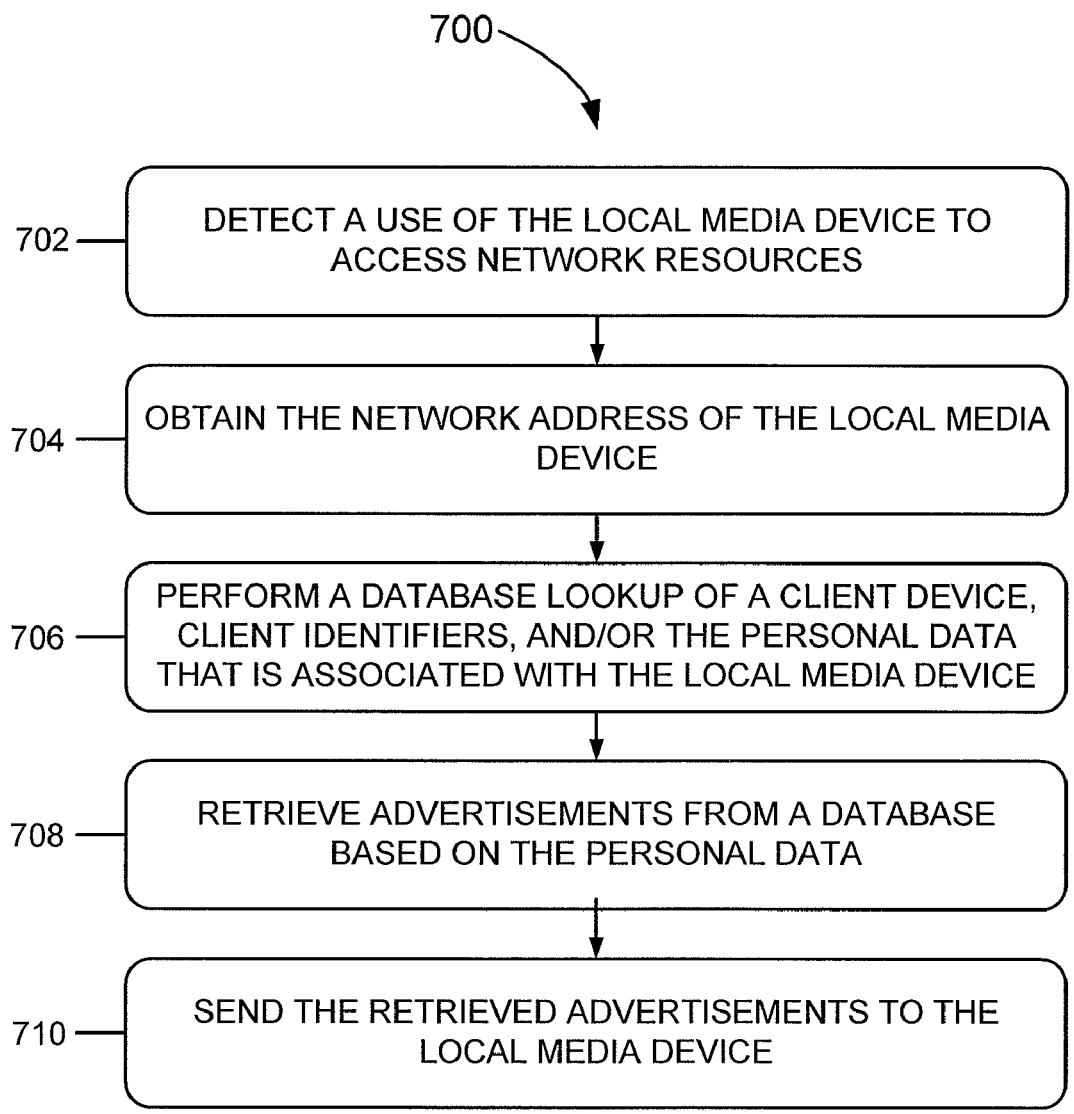

FIGS. 6 and 7 are flowcharts of exemplary processes for using personal data to obtain advertisements. In many implementations, processes 600 and 700 may be performed as background processes within various devices of system 100. In addition, processes 600 and 700 may be performed concurrently with other processes.

As shown in FIG. 6, at block 602, activities may be performed at client device 102. For example, client device 102 may be used to send/receive email messages, to browse the web, exchange text messages, place phone calls, view a calendar, etc. For each activity at client device 102, personal data may be collected (block 604). For example, a user may compose and send an email message about a particular topic and key words in the email may be extracted and collected as part of the personal data. More generally, a user's communication activities may be monitored for words that may indicate the user's interests. In another example, a usage pattern (e.g., application usage frequencies, word usage frequencies, etc.), the user's gender and/or age, user preferences (e.g., music taste) and/or other data may be collected as part of the personal data.

At block 606, the collected personal data may be sent to a server device. The personal data may be sent based on a schedule, based on demand from the server device, and/or based on an occurrence of a triggering event at client device 102. For example, PICT logic 406 may trigger a transfer of the personal data to the server device after database 408 collects personal data for longer than a predetermined number of days.

The personal data that is sent to server device 108 may include client identifiers. The client identifiers may be sent in many ways. For example, in one implementation, PICT logic 406 may send client identifiers in response to receiving a command string of the following syntax from another device (e.g., server device 108) or another module within client device 102, as illustrated in expressions (1)-(3) below.

subscriberinfo: S_PARAM_LIST?url = [URL] [&get_params]  (1)
S_PARAM_LIST ::= S_PARAM_LIST | S_PARAM,  (2)
S_PARAM_LIST
S_PARAM = LANG | PLMN | CPLMN | MODEL | UID  (3)

In the above expressions (1)-(3), subscriberinfo may indicate to PICT logic 406 that the command requests one or more client identifiers; and url and URL may indicate the client identifiers are to be sent to the specified URL. If &get_params is present, URL may include values of client identifiers that are to be sent within the URL. S_PARAM_LIST is a list of one or more parameters, each of which can be one of the following: LANG, PLMN, CPLMN, MODEL, or UID. LANG, PLMN, CPLMN, MODEL, and UID may indicate that the command requests an identification of the language of the subscriber, a home mobile network identifier, a current mobile network identifier, an identification of model of client device 102 (e.g., Sony CM-H777), and an identification of the user, respectively. In different implementations, S_PARAM_LIST may contain other types of parameters.

An example of a valid command string in accordance with the above syntax may include the following.

subscriberinfo: UID?url=http://www.markus.com/receive.asp (4)

When PICT logic 406 receives the command, PICT logic 406 may convert the command into a hypertext transfer protocol (HTTP) client information string (CIS). For example, when PICT logic 406 receives command (4), PICT logic 406 may convert command (4) into the following HTTP CIS.

http://www.markus.com/receive.asp?UID=1234324 (5)

In string (5), the URL "http://www.markus.com/receive.asp" is concatenated with "&," "UID," "=" and a user identifier, "1234324." In many implementations, a user identifier may be derived from International Mobile Subscriber Identification (IMSI) in Subscriber Identity Module (SIM), by encrypting the IMSI. The user identifier may uniquely identify the user of client device 102 and/or client device 102.

If a HTTP CIS has been derived from a command string, PICT logic 406 may send the HTTP CIS to server device 108, provided that server device 108 is capable of receiving client identifiers via HTTP. In other implementations, communication protocol other than HTTP may be used (e.g., secure HTTP (HTTPS)).

Figure 8:
FIG. 8 shows a web page provided by the server device of FIG. 1.

In some implementations, the request for client identifiers may be triggered by a user action at a web page provided by server device 108 via browser 404. For example, FIG. 8 shows a web page 800 provided by server device 108. As shown, web page 800 contains a hyperlink 802 that includes text "REQUEST PRODUCT EMAILS." Hyperlink 802, when it is viewed through a text editor, may contain the following.

```
<A HREF= "subscriberinfo: UID?url =
http://www.WhatYouAreLookingFor.com/SignUp.asp">
REQUEST PRODUCT EMAILS </A>                    (6)
```

If PICT logic 406 is implemented as a browser plug-in and if the user that is viewing web page 800 through browser 404 activates hyperlink 802, PICT logic 406 may create a command string "subscriberinfo: UID?url=http://www.WhatYouAreLookingFor.com/SignUp.asp" from expression (6) and convert the command string into an HTTP CIS, in the manner similar to that described for command string (4).

Returning to FIG. 6, local media device 104 may be contacted (block 608). The contact may be established through different communication channels/interfaces/networks, such as a Bluetooth interface, wireless LAN (WLAN), a near field communication (NFC) channel, and/or a wireless universal serial bus (WUSB). In addition, the contact may be made for different purposes, such as for transferring a file from client device 102 to local media device 104, for logging into local media device 104 to obtain information, for probing capabilities of local media device 104 to support playing or showing different types of advertisements or information (e.g., audio, video, images, text, etc.), etc. In one implementation, client device 102 may be set up as a controller for local media device 104 over a short range (e.g., less than 10 meters), and the contact may be established for the purpose of remotely controlling local media device 104.

At block 610, a network address of local media device 104 may be obtained. Examples of a network address include an IP address, a URL, a domain name, URI, etc.

The network address of local media device 104 may be sent to server device 108 (block 612). The network address may be sent based on a schedule, based on demand from the server device 108, and/or based on an occurrence of a triggering event at client device 102. For example, the network address may be sent if a new local media device has been discovered and/or contacted by client device 102. In another example, if local media device 104 obtains a new network address while local media device 104 is connected to client device 102, the new network address may be sent to server device 108.

Server device 108 may continually receive personal data from many client devices (e.g., client device 102) and network addresses that have been obtained by the client devices. For each client device, there may be more than one network address, as there may be more than one local media device for each client device. In addition, a set of personal data may be associated with each client device.

Periodically or based on demand from advertisement server device 110, server device 108 may send the personal data and the network addresses for each client device to advertisement server device 110. If the functionalities of server device 108 and advertisement server device 110 are hosted on a single device, server device 108 may not send the personal data and the network addresses to a separate device.

FIG. 7 shows exemplary process 700 that may be performed at advertisement server device 110. As shown, a use of local media device 104 to access network resources may be detected (block 702). Depending on the implementation of local media device 104, accessing network resources may include different types of activities. For example, if local media device 104 is implemented as an Internet Protocol (IP) television, accessing the network resources may involve downloading television shows and videos. If local media device 104 is implemented as a computer, accessing the network resources may involve obtaining videos, browsing web pages, and/or performing any other network functions that are associated with computers.

The use of local media device 104 may be detected in various ways, depending on the implementation of advertisement server device 110. For example, advertisement server device 110 may be implemented as a proxy server/gateway to a network to which local media device 104 is attached. In such instance, the use of local media device may be detected by examining network packets that flow from local media device 104 to advertisement server device 110. In another implementation, advertisement server device 110 may be implemented as a gateway to which a set-top box associated with local media device 104 is attached. In such implementations, activities at local media device 104 may be sensed by the set-top box that notifies advertisement server device 110. In yet another implementation, advertisement server device 110 may be implemented as a proxy for a search engine. The use of local media device 104 may be detected if advertisement server device 110 receives a search request from local media device 104 via browser 404.

At block 704, the network address of local media device 104 may be obtained (e.g., by extracting an IP address from packets that are used to detect the use of local media at block 702). At block 706, a database lookup of a client device, client identifiers, and/or the personal data that is associated with local media device 104 may be performed. The network address may be used as a lookup key in performing the lookup.

At block 708, advertisements may be retrieved from database 506 based on the personal data. The advertisement may match the user tastes, preferences, usage patterns, etc. that are reflected in the personal data. For example, the personal data may include the name of a pop singer and the advertisements may include recent albums that have been published by the singer. In some implementations, advertisement server device 110 may perform the search to retrieve material that can be used to assemble advertisements (e.g., video fragments). In yet other implementations, advertisement server device 110 may act as a proxy for a search engine. In such implementations, advertisement server device 110 may relay a user-submitted search terms to the search engine. Upon receiving search results from the search engine, advertisement server device 110 may filter and/or refine the search result based on the personal data. The filtered search result may be in the form of text, video, images, audio, URLs, etc.

At block 710, the advertisements that have been retrieved may be sent to local media device 104. Local media device 104 may show or play the advertisement in different ways. For example, if the advertisement is a video or an audio file, the advertisement may be played at local media device 104. If the advertisement is a search result (e.g., a list of URLs), the advertisement may be displayed by local media device 104 via browser 404. If the advertisement is a song or a piece of music, the advertisement may be played in the background while the user is engaged in an activity at local media device 104.

EXAMPLE

The following example illustrates the process involved in providing advertisement and/or content using personal data. The example is consistent with the exemplary processes described above with respect to FIGS. 6 and 7.

In the example, assume that a user of client device 102, Greta uses her client device 102. Client device 102 contains, in database 408, personal data that includes her age, gender, her preferences (e.g., preferences in music, interests in news, etc.). If Greta performs additional activities, such as listens to a piece of music, views a picture, exchanges instant messages, and/or downloads information from a website, the activities are monitored for words that may indicate her preferences and taste. The words are collected as part of her personal data and may be used to update and/or modify her personal data.

Assume that Greta's client device 102 is configured to operate as a controller for her IP television (i.e., local media device 104). Also, assume that Greta's IP television includes the capability to download videos and music via the Internet from a subscribed source. In addition, assume the IP television includes a browser, through which Greta can surf the web through client device 102, In the example, Greta flips through channels on her IP television via client device 102. In controlling the IP television, client devices 102 makes contact with the IP television through its Bluetooth interface and collects the IP address of the IP television. Later that day, Greta decides to go out, taking her client device 102. While she is at a local coffee shop, Greta notices different clothes that people are wearing, and decides that she wants to be notified of new fall fashion line of clothes. Greta visits web page 800 (FIG. 8) and clicks on hyperlink 802, which contains the text in expression (6). Consequently, PICT logic 406 in client device 102 sends Greta's personal data, including Greta's user identifier to server device 108. The user identifier is sent in an HTTP CIS that is derived from the command string within hyperlink 802. Server device 108 sends the personal data that is downloaded from client device 102 to advertisement server device 110, along with the IP address of Greta's IP television.

The next day, Greta decides to surf the web from her IP television. Greta starts browser 404 on her IP television and enters search terms. IP television connects to advertisement server device 110 that acts as a gateway to/from the local network to which the IP television is connected. Advertisement server device 110 obtains the IP address of the IP television, and performs a database lookup using the IP address as a key to identify a user associated with the IP television. Upon finding Greta's user identifier and her personal data, advertisement server device 110 uses the personal data to search and retrieve for advertisements that may interest Greta. For example, advertisement server device 110 may retrieve an advertisement page for Bloom (e.g., a retail store). The advertisement server device 110 may compose an email message and includes a link to Bloom's advertisement page.

When Greta receives the advertisement page and/or message from advertisement server device 110, she may view the advertisement page and/or the message and click on the link to Bloom's advertisement page. In either case, Greta may visit Bloom's web site and consider purchasing various outfits that are on sale. In this manner, a user may more likely receive relevant advertisements via local media device 104.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, a user setting may be used to determine if the user is willing to use personal data to obtain advertisements. In another example, local media device 104 and server device 108 may be implemented on a same device. In such implementations, personal data may be transferred from client device 102 to local media device 104 to advertisement server device 110. In addition, the network address need not be transferred from local media device 104 to server device 108. In still another example, private information (e.g. a list of songs in a directory) may be transferred from client device 102 to local media device 104, which, in turn, may use the private information to derive personal data that is to be sent to advertisement server device 110. In such implementations, a software application in local media device 104 may perform various tasks associated with obtaining the personal data from the private information (e.g., determining a musical preference based on music files that are stored on client device 102).

In some implementations, an advertisement server device 110 may include an Internet search engine. In such cases, server device 108 may act as a proxy that sends search queries to the search engine, receives search results from the search engine, and sends the search results to local media device 104. Before sending a query, the query may be formulated at server device 108 by using search terms that are received from browser 404 at local media device 104 and by using personal data. Alternatively, server device 108 may simply relay the search terms from browser 404 at local media device 104 to the search engine, receive the search results from the search engine, filter the search results based on personal data, and send the filtered result to local media device 104.

In many implementations, server device 108 may be affiliated with a different company than that of advertisement server device 110. The company that owns server device 108 or any device that collects personal data may market the personal data to companies that wish to use the personal data target their advertisements to a particular audience.

With regard to FIGS. 6 and 7, while series of blocks have been described above, the order of the blocks may be modified. For example, block 608 may be performed before block 602. Block 608 may be omitted if local media device 104 and server device 108 are implemented on the same device. Furthermore, non-dependent blocks in FIGS. 6 and 7 may represent acts that can be performed in parallel to other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   collecting personal data of a user, via a client device associated with the user;
   obtaining, at the client device, a network address of a media device, associated with the user, through a wireless communication link provided between the client device and the media device;
   sending, via the client device, the network address to a server that relays the network address to an advertisement device; and
   sending, via the client device, the collected personal data to the server, where the server relays the personal data to the advertisement device and the advertisement device retrieves advertisements based on the personal data and sends the retrieved advertisements to the media device.

2. The method of claim 1, where collecting the personal data includes:
   obtaining information about preferences, tastes, or application usage patterns associated with the user.

3. The method of claim 1, further comprising:
   receiving, from the user and via the client device, an input that gives permission to send the personal data to the server.

4. The method of claim 1, further comprising:
   determining whether the media device receives a new network address; and
   sending the new network address to the server when the media device receives the new network address.

5. The method of claim 1, where collecting the personal data includes:
   monitoring communication messages of applications at the client device, and extracting, from the messages, terms that indicate preferences of the user.

6. The method of claim 1, where collecting the personal data includes:
   obtaining an identifier associated with the client device.

7. The method of claim 6, where obtaining a the identifier includes:
   obtaining a user identifier that uniquely identifies the user.

8. The method of claim 1, further comprising:
   receiving a request to send identifiers, associated with the client device, as part of the personal data.

9. The method of claim 8, where receiving the request to send identifiers includes:
   receiving a request to send one or more of
      a language identifier,
      a home mobile land network identifier,
      a current mobile land network identifier,
      an identifier that identifies a model of the client device, or
      a user identifier.

10. The method of claim 8, where collecting the personal data includes:
    obtaining the identifiers from within the request.

11. The method of claim 1, where sending the collected personal data includes:
    forming a symbol string in accordance with a hypertext transfer protocol;
    concatenating, to the symbol string, additional symbols that encode identifiers associated with the client device in accordance with the hypertext transfer protocol; and
    sending the concatenated symbol string.

12. The method of claim 1, where collecting the personal data includes:
    activating, via a browser, a link that incorporates a command to collect and send identifiers associated with the client device.

13. A device comprising:
    a processor to:
       receive personal data of a user that is collected at a client device associated with the user;
       obtain, from the client device, a network address of a media device associated with the user, where the client device obtains the network address via a wireless communications link established between the client device and the media device;
       send the network address to an advertisement device; and
       send the personal data to the advertisement device, where the advertisement device retrieves advertisements based on the personal data and sends the retrieved advertisements to the media device.

14. The device of claim 13, where the personal data includes at least one of:
    user preferences associated with the user, or
    client identifiers associated with the client device.

15. The device of claim 13, where the processor is further to:
    receive, from the client device, a new network address of the media device when the media device obtains the new network address.

16. The device of claim 13, where the processor is further to:
    send, to a client device, a request to provide a client identifier as part of the personal data; and
    send, to a client device, a request to provide the personal data.

17. The device of claim 16, where the request to send the client identifier includes:
    a hypertext transfer protocol string that contains the client identifier.

18. A device comprising:
    a processor to:
       receive, from a server device, personal data of a user that is collected at a client device associated with the user;
       store the personal data in a database;
       receive, from the sever device, a network address of a media device associated with the user;
       determine whether the media device is active;
       retrieve the personal data, from the database and based on the network address, when the media device is determined to be active;
       determine one or more advertisements based on the retrieved personal data; and
       send the one or more advertisements to the media device.

19. The device as in claim 18, where the personal data includes words derived from filtering communication messages at the client device.

20. A media device comprising:
- means for requesting personal data of a user associated with the media device that is collected at a client device that is associated with the user;
- means for receiving the personal data from the client device via a means for providing wireless connection between the media device and the client device; and
- means for sending the network address of the media device to an advertisement device,
- means for sending the personal data to the advertisement device, the advertisement device retrieving advertisements based on the personal data and sending the retrieved advertisements to the media device in response to the advertisement device being notified of activities at the media device.

* * * * *

UNITED STATES PATENT AND TRADEMARK OFFICE
CERTIFICATE OF CORRECTION

PATENT NO. : 7,702,813 B2  Page 1 of 1
APPLICATION NO. : 11/760261
DATED : April 20, 2010
INVENTOR(S) : Mans Folke Markus Andreasson et al.

It is certified that error appears in the above-identified patent and that said Letters Patent is hereby corrected as shown below:

Claim 18, line 59, delete the word "sever" and replace with "server"
    Claim 20, column 15, line 10, delete the word "and"
    Claim 20, column 16, line 2, delete "," and replace with "; and"

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,702,813 B2  Page 1 of 1
APPLICATION NO. : 11/760261
DATED : April 20, 2010
INVENTOR(S) : Mans Folke Markus Andreasson et al.

It is certified that error appears in the above-identified patent and that said Letters Patent is hereby corrected as shown below:

Claim 18, column 14, line 59, delete the word "sever" and replace with "server"
Claim 20, column 15, line 10, delete the word "and"
Claim 20, column 16, line 2, delete "," and replace with "; and"

This certificate supersedes the Certificate of Correction issued June 8, 2010.

Signed and Sealed this

Twenty-ninth Day of June, 2010

David J. Kappos
*Director of the United States Patent and Trademark Office*